United States Patent
Svay et al.

(10) Patent No.: US 9,733,374 B2
(45) Date of Patent: Aug. 15, 2017

(54) REPEATABILITY INDICATOR BASED ON SHOT ILLUMINATION FOR SEISMIC ACQUISITION

(71) Applicant: CGG SERVICES SA, Massy (FR)

(72) Inventors: Julie Svay, Guyancourt (FR); Nicolas Bousquie, Longpont sur Orge (FR); Thomas Mensch, Paris (FR); Risto Siliqi, Paris (FR)

(73) Assignee: CGG SERVICES SAS, Massy (FR)

( * ) Notice: Subject to any disclaimer, the term of this patent is extended or adjusted under 35 U.S.C. 154(b) by 725 days.

(21) Appl. No.: 14/102,592

(22) Filed: Dec. 11, 2013

(65) Prior Publication Data

US 2014/0172308 A1 Jun. 19, 2014

Related U.S. Application Data

(60) Provisional application No. 61/738,066, filed on Dec. 17, 2012.

(51) Int. Cl.
| | | |
|---|---|---|
| G01V 1/00 | (2006.01) | |
| G01V 1/28 | (2006.01) | |
| G01V 1/34 | (2006.01) | |
| G01V 1/30 | (2006.01) | |

(52) U.S. Cl.
CPC ............... *G01V 1/34* (2013.01); *G01V 1/308* (2013.01)

(58) Field of Classification Search
None
See application file for complete search history.

(56) References Cited

U.S. PATENT DOCUMENTS

| | | |
|---|---|---|
| 6,691,075 B1 | 2/2004 | Winbow et al. |
| 6,925,386 B2 | 8/2005 | Pramik et al. |
| 7,406,383 B2 | 7/2008 | Herrmann et al. |
| 2009/0279386 A1 | 11/2009 | Monk |
| 2010/0118650 A1* | 5/2010 | Eick .............. G01V 1/24 367/38 |
| 2011/0002194 A1* | 1/2011 | Imhof ............ G01V 1/32 367/53 |

(Continued)

OTHER PUBLICATIONS

D. Hill, et al., "Medical Image Registration", Physics in Medicine and Biology, 2001, R1-R45, 46, Institute of Physics Publishing.

(Continued)

*Primary Examiner* — David M Gray
*Assistant Examiner* — Geoffrey T Evans
(74) *Attorney, Agent, or Firm* — Patent Portfolio Builders PLLC

(57) ABSTRACT

Methods and systems for similarity indicator calculation associated with seismic data acquisition are described. A similarity indicator value can, for example, be based on a normalized partitioned intensity uniformity (PIU) metric. In another aspect, shot imprints are compared by mapping a base (reference) shot imprint onto a current sample of a shot imprint before calculating the similarity indicator value. The similarity indicator value is associated with the shot imprint location used in the calculation and allows re-shooting of only the areas where an insufficient quality of shot data is detected based on a preconfigured threshold value for the similarity indicator.

16 Claims, 10 Drawing Sheets

(56) References Cited

U.S. PATENT DOCUMENTS

| | | | | |
|---|---|---|---|---|
| 2012/0121149 A1* | 5/2012 | Murashita | ............. | G06T 3/4069 |
| | | | | 382/131 |
| 2012/0121150 A1* | 5/2012 | Murashita | ............. | G06T 3/4023 |
| | | | | 382/131 |
| 2014/0297189 A1* | 10/2014 | Svay | ...................... | G01V 1/345 |
| | | | | 702/16 |
| 2014/0297190 A1* | 10/2014 | Svay | ...................... | G01V 13/00 |
| | | | | 702/16 |

OTHER PUBLICATIONS

R. Woods, et al., "MRI-PET Registration with Automated Algorithm", Journal of Computer Assisted Tomography, Jul./Aug. 1993, pp. 536-546, 17, Raven Press Ltd., New York.

* cited by examiner

REPEATABILITY INDICATOR BASED ON SHOT ILLUMINATION FOR SEISMIC ACQUISITION

TECHNICAL FIELD

Embodiments of the subject matter disclosed herein generally relate to methods and systems for marine-based seismic data processing and, more particularly, to mechanisms and techniques for generating a repeatability or similarity indicator based on, for example, shot illumination.

BACKGROUND

Marine-based seismic data acquisition and processing techniques are used to generate a profile (image) of a geophysical structure (subsurface) of the strata underlying the seafloor. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process.

The acquisition of data in marine-based seismic methods usually produces different results in source strength and signature based on differences in acquisition configuration and sub-surface conditions. Further data processing and interpretation of seismic data can be improved when the data collection methods produce results with the greatest degree of repeatability. For example, determining during an acquisition survey that a problem has developed that will degrade the results of the acquisition survey by generating imaging with a low degree of repeatability is important to producing the highest quality seismic imaging.

Fold maps indicate the ability of a seismic survey to illuminate the sub-surface. In essence, these maps ought to describe where seismic reflections occur in depth and how redundant they are. Conventional fold maps are counted on common-midpoints and in-fill decisions made solely upon surface geometrical criterion.

However in laterally heterogeneous media or for dipping reflectors, the midpoint does not stand anymore for the reflection point. Thus, whenever knowledge about sub-surface velocity model becomes available (e.g., from geological a priori or processing of vintage surveys), true mapping should be achieved which takes into account wave-paths distortion during propagation through the subsurface. The hit-count of reflection paths must be restored in common-reflection points at given depth horizons to access true illumination on targets.

Recently, so-called 4D or time-lapse surveys have become an important addition to the product offerings of seismic survey companies. In 4D surveys, a first survey taken at a first time operates as a baseline to indicate the potential presence/absence of hydrocarbon deposits in a given area. A second survey, taken later, operates to indicate the potential presence/absence of hydrocarbon deposits in the same geographical area, e.g., after removal of the hydrocarbons has occurred. By comparing the two surveys, a 4D picture (where time is the fourth dimension) can be developed which can be used for a number of purposes, e.g., to determine the continued viability of a hydrocarbon field, where to drill, etc. However, in order for a 4D survey to be accurate, the first and second surveys need to be performed in a very similar manner, e.g., shot position, receiver position, etc. This gives rise to a need to make surveys highly repeatable and to determine when subsequent surveys are not accurate repetitions of an earlier, baseline survey.

Thus, mis-positioning between surveys (due to source deviation or streamer feathering) may induce biased perturbations that need to be assessed. Beyond geometrical criterion, monitoring of target illumination provides a geophysical criteria with which to evaluate seismic repeatability.

It has been suggested in the literature to perform full fold mapping on depth-horizons using ray theory, either from hit-count or band-limited Fresnel zone. Such maps can be used for quality control of seismic acquisition data, although they may be insufficiently discriminant. Additionally, correspondence between illumination misfits and associated shooting positions is no more obvious, impeding easy localization for re-shoots. Stated differently, attempts to detect and correct for unacceptable repeatability of seismic images have involved the use of illumination maps for seismic coverage analysis but these attempts are unable to disclose the shot position associated with the unacceptable repeatability location, therefore losing the value of reshooting only locations where repeatability issues occurred.

Accordingly, it would be desirable to provide systems and methods that avoid the afore-described problems and drawbacks, and provide the ability to quickly determine if shot images are within acceptable repeatability limits and reshoot only those shot positions that fall outside of the previously described limits.

SUMMARY

Various embodiments provide, among other things, for the generation and usage of similarity indicators which provide an indication of the similarity between two seismic datasets, e.g., a first dataset associated with a first seismic survey of a given geographic area and a second dataset associated with a second seismic survey of the same geographic area. Such similarity indicators can, as described above, be useful in performing 4D seismic surveys, e.g., by providing a user-friendly tool for on-board quality control of 4D repeatability, and real-time support for re-shoot decisions.

For example, according to an exemplary embodiment, a method for generating a similarity indicator between a plurality of seismic datasets includes the steps of obtaining a first seismic dataset collected at a first time and second seismic dataset collected at a second time, calculating a first image registration metric based on at least one of said first seismic and said second seismic dataset, calculating a second image registration metric based on at least one of said first seismic data set and said second seismic dataset; and generating a similarity indicator between said first seismic dataset and said second seismic dataset using said first and second image registration metrics.

According to another exemplary embodiment, a system for generating a similarity indicator between a plurality of seismic datasets includes one or more processors configured to execute computer instructions and a memory configured to store said computer instructions wherein said computer instructions further comprise a collection component configured to receive a first seismic dataset collected at a first time and a second seismic data set collected at a second time; an engine component configured to process said first and second seismic datasets and calculating a first image registration metric and a second image registration metric; a similarity component configured to calculate a similarity indicator based on said first image registration metric and said second image registration metric; and an output component configured to output said similarity indicator.

According to a further embodiment, a method for generating an illumination map between portions of a plurality of seismic datasets includes the steps of obtaining a first seismic dataset collected at a first time and second seismic dataset collected at a second time; and generating a partial illumination map using only a portion of the first seismic dataset and a portion of the second seismic data set.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to the terminology and structure of a 4D repeatability indicator based on similarity between illumination imprints of a current shot versus a reference shot. However, the embodiments to be discussed next are not limited to these configurations, but may be extended to other arrangements as discussed later.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to various embodiments presented herein, a complementary indicator is provided to, e.g., assess 4D repeatability at finer discrimination scales, ranging from a set of acquisition lines down to individual shots. A similarity between base and monitor individual shots (or lines) is evaluated from a comparison of associated illumination imprints on target. A similarity value is derived from an image registration metric, e.g., a Partitioned Intensity Uniformity metric which is a matching measure typically used in medical image registration. This similarity value or repeatability indicator can help seismic survey teams to decide whether to, and then to locate, necessary re-shoot lines as part of seismic coverage analysis.

Figure 1:
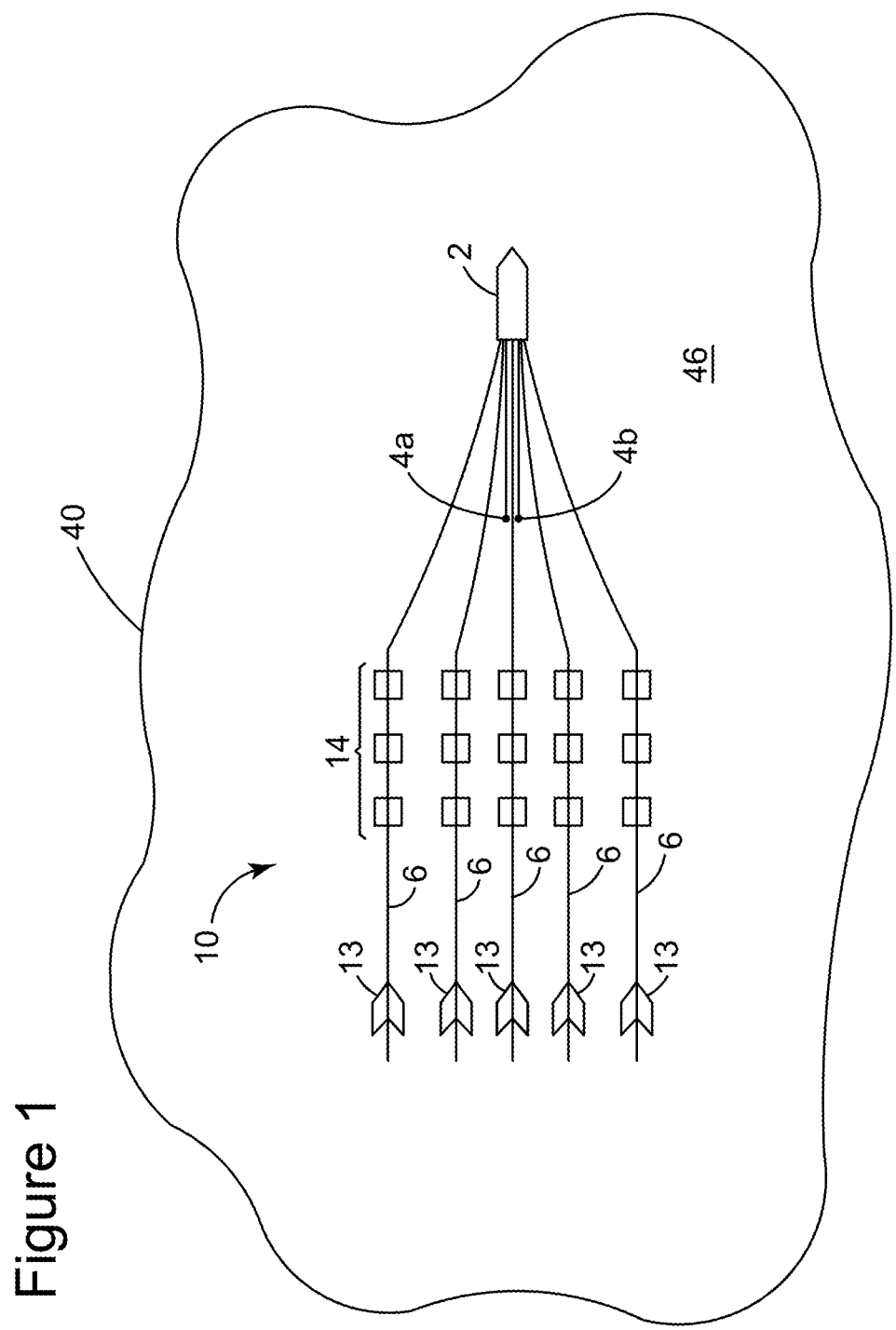
FIG. 1 depicts a top view of a conventional marine seismic survey system.

In order to provide a context for the subsequent exemplary embodiments associated with 4D repeatability indicators, a brief, generalized description of marine seismic surveying, followed by a discussion of aspects and terminology associated with such surveying is first provided. For a seismic gathering process, as shown in FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 (or by another ship) for generating seismic waves.

Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. When each source in array 4a or 4b is "fired" to generate an acoustic wave, this is termed a "shot" and thus as the arrays 4a, 4b traverse a geographical area, the seismic survey generates a number of "shot lines". Accordingly, marine seismic surveying is sometimes generally referred to as "shooting" a particular seafloor area, and the seafloor area can be referred to as a "cell". It will be appreciated that the configuration illustrated in FIG. 1 is purely exemplary, and that the streamers (receivers) and sources can be arrayed in numerous other configurations.

Figure 2:
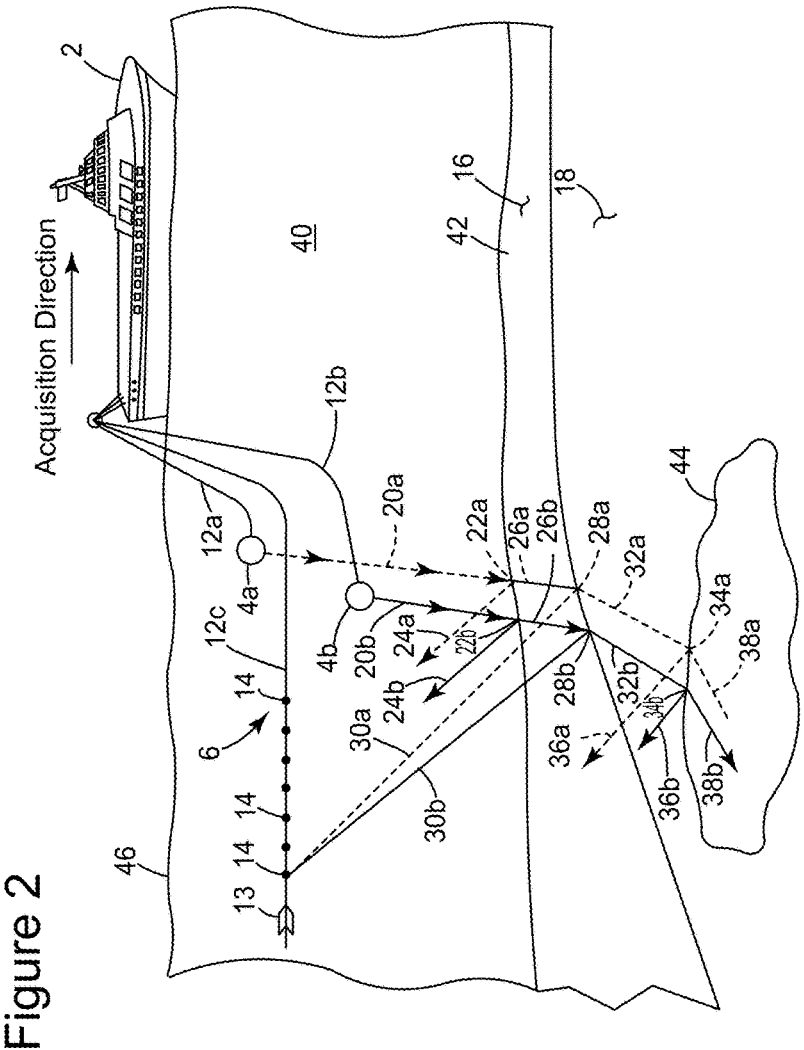
FIG. 2 illustrates a side/cut-away view of the conventional marine seismic survey system of FIG. 1.

FIG. 2 illustrates a side view of the exemplary data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the principles involved, only a first transmitted signal 20a will be shown (even though some or all of source 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction n1 and meets with a different medium, with a second index of refraction n2, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. As known by those of ordinary skill in the art, signal 50a shown in FIG. 2 is one such example of a multiple, but there are other ways for multiples to be generated.

Among other things, the point of the discussion of FIGS. 1 and 2 is to illustrate that marine seismic surveying for hydrocarbon deposits beneath the seafloor is a highly complex procedure, making repeatability for subsequent in time 4D surveys that much more important to achieve accurate results.

According to some embodiments, the methods and systems described herein generate and/or collect illumination imprints for analysis. Some terminology will first be described. A P-wave is the wave studied in conventional seismic data and is an elastic body wave or sound wave in which particles oscillate in the direction the wave propagates. A streamer is a line towed by a streamer vessel and containing a plurality of receivers for collecting seismic data from the reflected P-wave.

In a further description of terminology, a shotpoint is one of a number of locations or stations at a surface datum at which a seismic source is activated. A seismic trace is the seismic data recorded, by one channel, after the seismic source has been fired. The seismic trace represents the response of the elastic wave field to velocity and density contrasts across interfaces of layers of rock or sediments in the seabed as energy travels from the seismic source through the subsurface to a receiver or receiver array. Further, a seismic inversion is a process of transforming seismic reflection data into a quantitative property description of a strata description of an underground location and possibly a reservoir containing natural resources such as oil or gas.

According to some embodiments described herein, similarity indicators rely on the determination of sub-surface illumination. In this context, for a given target point, illumination can be defined as the weighted occurrence of reflection impacts, that is basically, the number of source-receiver couples for which asymptotic reflection takes place at that point. Given a source and receiver pair (s, r) and a depth horizon H, an automatic detection of a reflection point $x_r$, a member of the depth horizon set H, can be achieved under asymptotic ray theory based on Fermat's principle and stationary phase analysis as described, for example, by Herrmann and Bousquie in U.S. Pat. No. 7,406,383, the disclosure of which is incorporated herein by reference.

Basically for each depth point, double travel time from s to r via x and its respective spatial derivatives along the horizon are calculated. The reflection point associated to a given source-receiver pair is detected as the point for which tangential gradient of the double travel time is zero. At reflection points the normal gradient of the double travel time is then co-linear to the local dip. In practice, travel times maps may be computed off-line from pre-plot positions before conducting the monitor survey. Real-time calculation of reflection points can then be obtained on-board from fast interpolation to actual sources and receivers positions.

Considering next the issue of illumination spread, the illumination spread is the elementary component of a shot imprint. In other words, a shot imprint is the stack of all illumination spreads from all the receivers of all the streamers. The choice of functions A and S described below thus impact the spatial extent and amplitude of the spread (hence of the shot imprint). Seismic sources carry band-limited frequency content and a single reflection point actually consists in a whole vicinity of reflection points which is the normal cross-section to $\mathcal{H}$ between incident and reflected ray beams. Therefore, each source-receiver pair (s, r) is associated with a trace illumination spread which contour is delimited from Fresnel zone and amplitude allocated for each point $x \in \mathcal{H}$ is set as:

$$I(x)=A(s,x,r)S(t(x)-t(x_r))$$

In the above equation, S(t) is a weight function normalized at reflection point $x_r$ and designed from the seismic source wavelet. S(t) decreases as x is moving away from $x_r$ and vanishes beyond the Fresnel zone. Under a high-frequency assumption, S(t) is the Dirac impulse so that the spread reduces to a single reflection point with unit illumination amplitude. A(s,x,r) is an optional weight function that can be freely tuned for the illumination amplitude to approach migration amplitude (e.g., for correction of geometrical spreading and directivity, etc.).

A shot imprint can be defined as the target illumination associated with a single acquisition shot. Thus, a shot imprint is the summation of illumination spreads obtained from one source and all receivers in the towed streamer array(s). According to some embodiments described herein, shot imprints are processed as images represented by pixels with different intensities, i.e., associated with reflection point locations and either hit count or illumination amplitude. These representations, i.e., current imprints and reference imprints, are then compared according to embodiments based on an image registration metric. According to one embodiment, the image registration metric is a Partition Intensity Uniformity (PIU) metric as described, for example, by R. P. Woods, J. C. Mazziota, and S. R. Cherry in their 1993 article entitled "MRI-PET Registration with Automated Algorithm," published on pages 536-546 of the Journal of Computer Assisted Tomography 17(4), the disclosure of which is incorporated herein by reference. However, as will be described below, other types of image registration metrics can be used as the basis for calculating the similarity indicator according to other embodiments.

Figure 3:
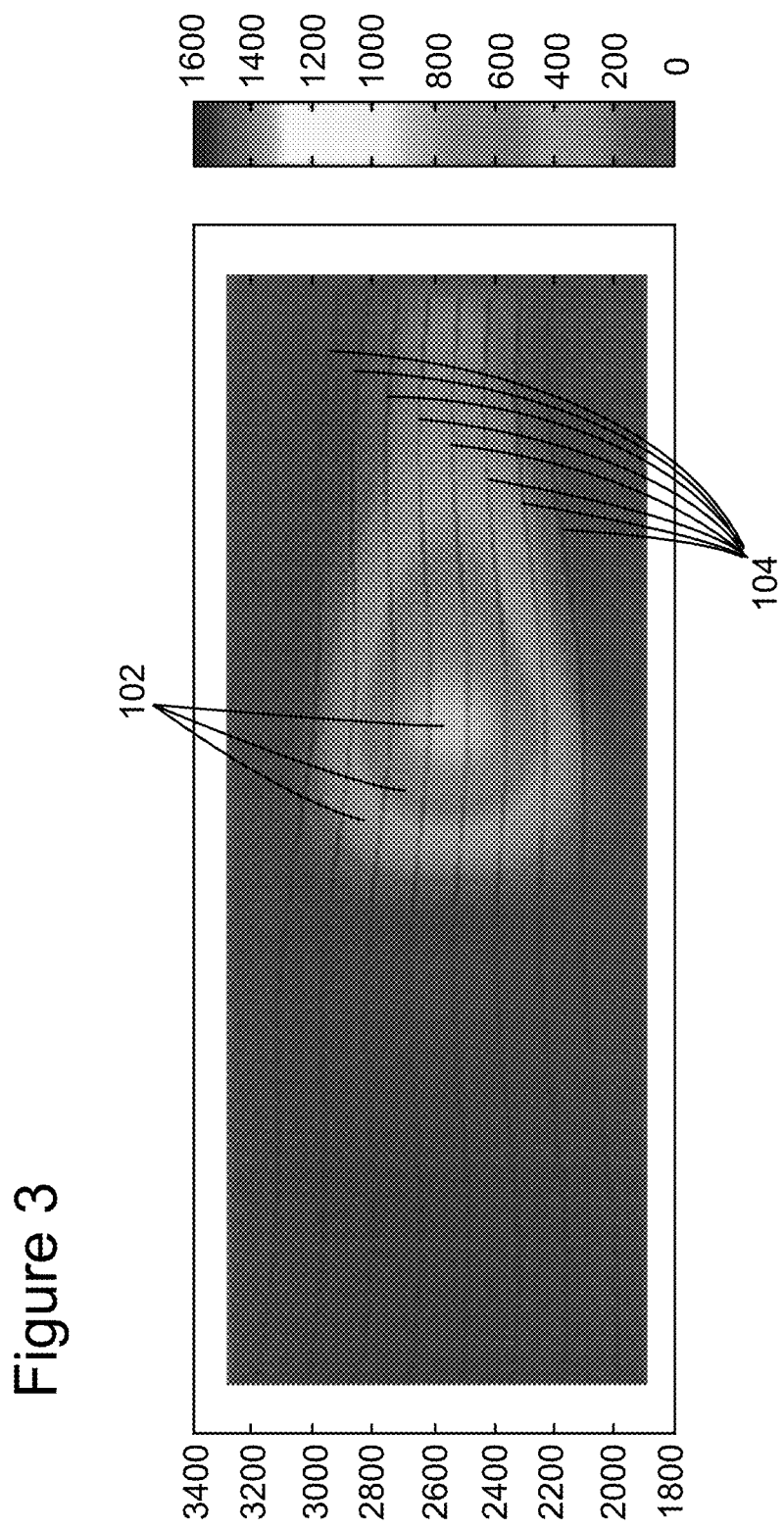
FIG. 3 is a schematic diagram illustrating a shot illumination imprint on a depth horizon superimposed with the surface geometry of the streamers.

Looking now to FIG. 3, a context diagram 100 illustrates a shot illumination imprint 102 superimposed with a surface geometry representation 104 of the streamers used for collecting the data associated with the shot illumination imprint 102. Consider that this shot illumination imprint 102 is associated with a first (baseline) seismic survey to be repeated for use in generating a 4D survey. According to these exemplary embodiments, a repeatability indicator is provided which assesses the seismic impact of both source and/or receiver misfits in lateral positioning of the equipment between the first survey and the later survey. It should be noted in the exemplary embodiment that such misfits in lateral positioning can result from many causes, e.g. source deviation, streamers feathering, etc. from one shot to another.

Figure 4:
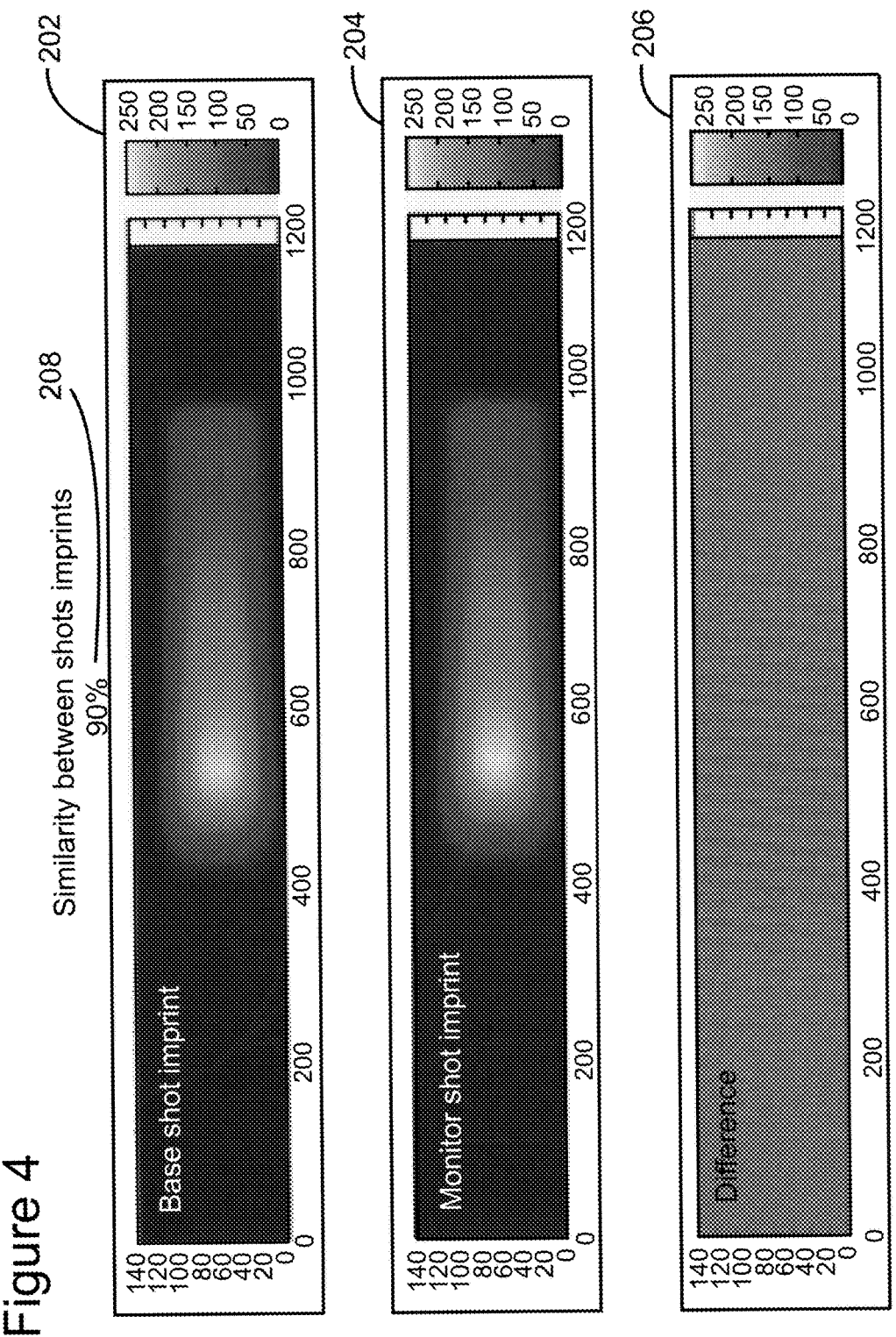
FIG. 4 is a schematic diagram illustrating a base shot imprint, a monitor shot imprint and a difference image.

Continuing with FIG. 4, illustrated in the exemplary embodiment is a depiction of the similarity (or equivalently the dissimilarity) between two shot images comprising an image of a base (reference) shot 202, an image of a monitor (current) shot 204, and a mapped image 206 of the difference between the base shot image 202 and the monitor shot image 204. As indicated in the exemplary embodiment similarity 200 depiction, a repeatability indicator 208 reflects a ninety percent similarity between the two images. It should be noted in the exemplary embodiment that the repeatability indicator is a four dimension (4D) calculation with the fourth dimension being time, i.e., the base shot image and the monitor shot image are taken at different times.

Figure 5:
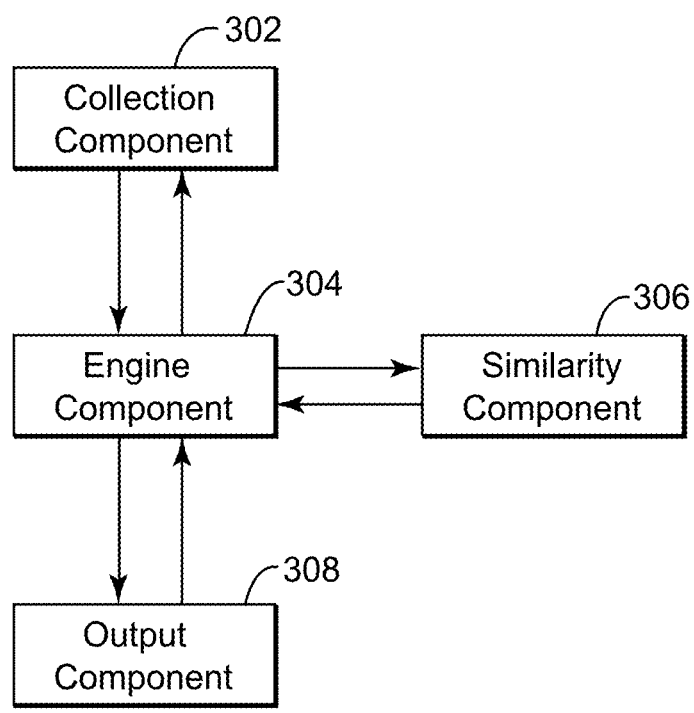
FIG. 5 is a schematic diagram illustrating a collection component, an engine component, a similarity component, and an output component of a similarity indicator.

Looking now to FIG. 5, an exemplary embodiment repeatability indicator system 300, which can be implemented as software, hardware or a combination thereof, comprises a collection component 302, an engine component 304, a similarity component 306, and an output component 308. The collection component 302 provides the capability to acquire the datasets representing the shot imprints. It should be noted in the exemplary embodiment that the datasets representing the shot imprints comprise both base imprints and monitor imprints. Continuing with the exemplary embodiment, the engine component 304 provides the capability to partition a base imprint into iso-intensity sets. Next in the exemplary embodiment, the engine component 304 provides the capability to map the iso-intensity sets onto a monitor imprint.

Continuing with the exemplary embodiment, the similarity component 306 provides the capability to calculate a Partitioned Intensity Uniformity (PIU) metric for the base-monitor imprint pair. As mentioned earlier, the selection of the PIU metric as an exemplary image registration metric from which to calculate a similarity indicator is purely illustrative and other embodiments may use other metrics as will be described below. The base imprint is partitioned into iso-intensity sets b, which are mapped to the monitor imprint. The equation for the PIU for the base-monitor pair mapped imprint according to an embodiment can then be calculated as:

$$PIU \text{ (base, monitor)} = \sum_b \frac{n_b}{N} \frac{\sigma_b(\text{monitor})}{\mu_b(\text{monitor})}$$

where N is the total number of pixels in the imprints, $n_b$ is the number of base pixels within iso-intensity set b, $\mu_b$ is the mean measured on the monitor imprint within each mapping $b^T$ of set b and $\sigma_b$ is the standard deviation measured on the monitor imprint within each mapping $b^T$ of set b as:

$$\mu_b(\text{monitor}) = \frac{1}{n_b} \sum_{x \in b^T} I_{monitor}(x)$$

$$\sigma_b^2(\text{monitor}) = \frac{1}{n_b} \sum_{x \in b^T} (I_{monitor}(x) - \mu_b(\text{monitor}))^2$$

and the equation for the PIU base imprint is defined as:

$$PIU \text{ (base, base)} = \sum_b \frac{n_b}{N} \frac{\sigma_b(\text{base})}{\mu_b(\text{base})}$$

where N is the total number of pixels in the imprints, $n_b$ is the number of base pixels within iso-intensity set b, $\mu_b$ is the mean measured on the base imprint within each mapping $b^T$ of set b and $\sigma_b$ is the standard deviation measured on the base imprint within each mapping $b^T$ of set b as:

$$\mu_b(\text{base}) = \frac{1}{n_b} \sum_{x \in b^T} I_{base}(x)$$

$$\sigma_b^2(\text{base}) = \frac{1}{n_b} \sum_{x \in b^T} (I_{base}(x) - \mu_b(\text{base}))^2$$

wherein I is the intensity measurement of data point x and where the similarity indicator between the base shot imprint and the monitor shot imprint is defined as the normalized metric:

$$\text{Similarity} = \frac{PIU \text{ (base, monitor)}}{PIU \text{ (base, base)}}$$

It should be noted in the exemplary embodiment that similarity indicators between lines or limited sets of lines can be evaluated in the same manner. It should further be noted that the foregoing algorithms for determining similarity between base and monitor imprints are purely exemplary and that other algorithms or techniques can be used.

Next in the embodiment, an output component 308 provides the capability to output the similarity indicator for use in determining, for example, if a particular location should be re-shot based on insufficient repeatability between shots. It should be noted in the exemplary embodiment that the similarity indicator can be used locally, e.g., on a vessel, for further analysis or it can be transmitted to a remote location for analysis and the preparation of a list of re-shoot locations for transmission back to the seismic survey location.

For example, the PIU metric is adapted to provide a scalar percentage measure of similarity between base and monitor imprints. This similarity indicator rates the seismic repeatability of illumination from current shot versus reference shot with a simple percentage value. In the same manner, it can be used to evaluate similarity of illumination between lines or limited set of lines from different vintages. As such, it provides an easy-to-use criterion to validate or discard shots or lines for on-board quality control of acquisition repeatability.

Figure 6:
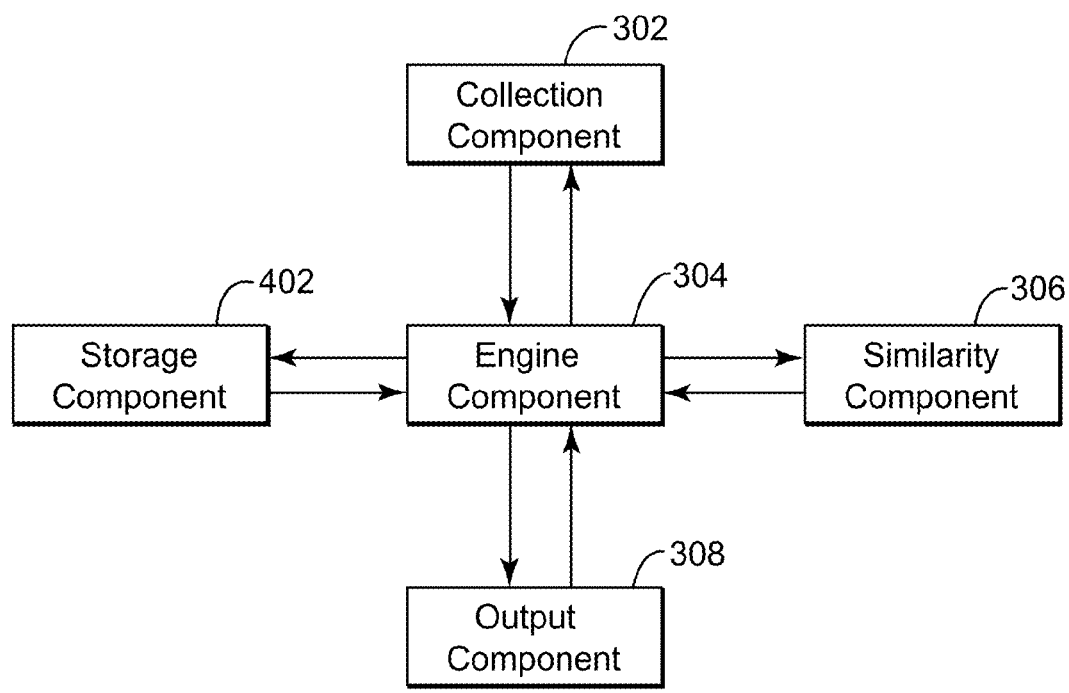
FIG. 6 is a schematic diagram illustrating a collection component, an engine component, a similarity component, and an output component of a similarity indicator and including a storage component.

Looking now to FIG. 6, an exemplary embodiment 400 comprises the repeatability indicator system 300 of FIG. 5 and also a storage component 402. The exemplary embodiment storage component 402 provides the capability to archive base shot imprints, current shot imprints, mapped shot imprints, Partitioned Intensity Uniformity metrics, and/ or Similarity Indicators, i.e., various subsets of the data used to generate the similarity indicator. It should be noted in the exemplary embodiment that the above described archived data associated with the storage component 402 can be transmitted to remote locations for storage or analysis.

Figure 7:
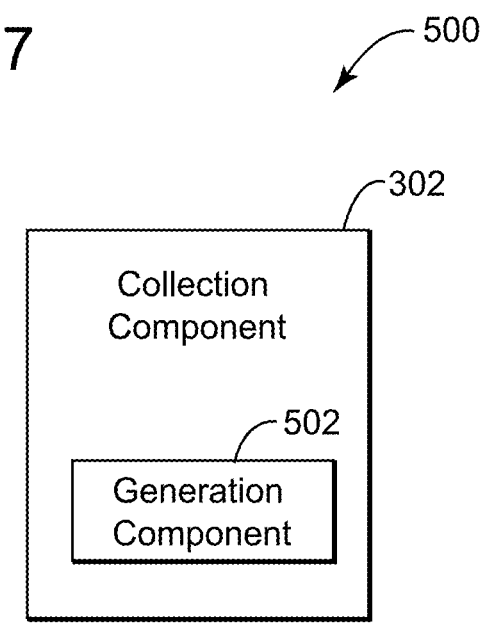
FIG. 7 is a schematic diagram illustrating a collection component further comprising a generation component.

The exemplary embodiment 500 of FIG. 7 depicts a collection component 302 of FIG. 5 further comprising a generation component 502. The exemplary embodiment generation component 502 provides the capability for the repeatability indicator to generate the imprints making up the base and/or monitor imprints. It should be noted in this exemplary embodiment that generated imprints are prepared at the time of analysis rather than retrieved from a database or other storage location, although other embodiments may use the latter technique for generation of the similarity indicator.

Figure 8:
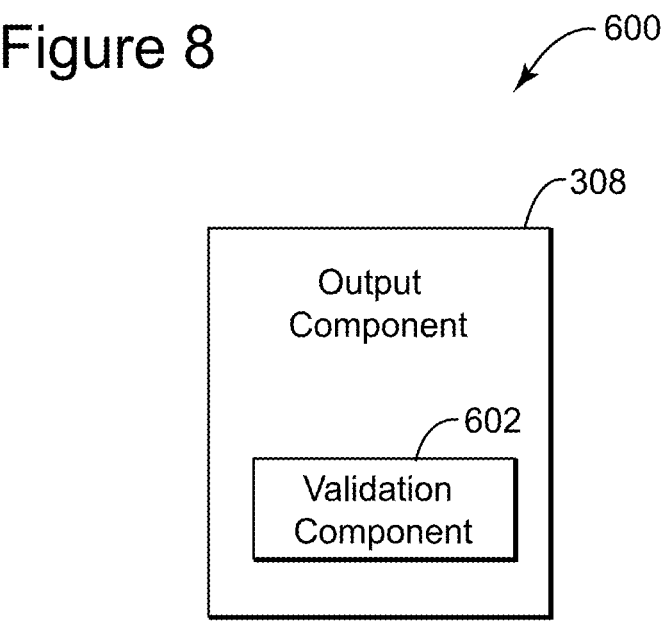
FIG. 8 is a schematic diagram illustrating an output component further comprising a validation component.

Next, in the exemplary embodiment 600 of FIG. 8, the output component 308 of FIG. 5 further comprises a validation component 602. The validation component 602 provides the capability to validate a current shot imprint while the seismic survey is ongoing. Continuing with the exemplary embodiment, as repeatability indicator values are calculated for shot imprints, they are analyzed to determine if the value is greater than a predefined threshold, if the repeatability indicator value is below the predefined threshold then the location associated with the current shot imprint used for the determination is scheduled for re-sampling/re-shooting. It should be noted in the exemplary embodiment that individual shot locations are re-sampled, not the entire seismic area. It should further be noted in the exemplary embodiment that similarity between lines or a limited set of lines can be analyzed and re-sampled in a similar manner.

Figure 9:
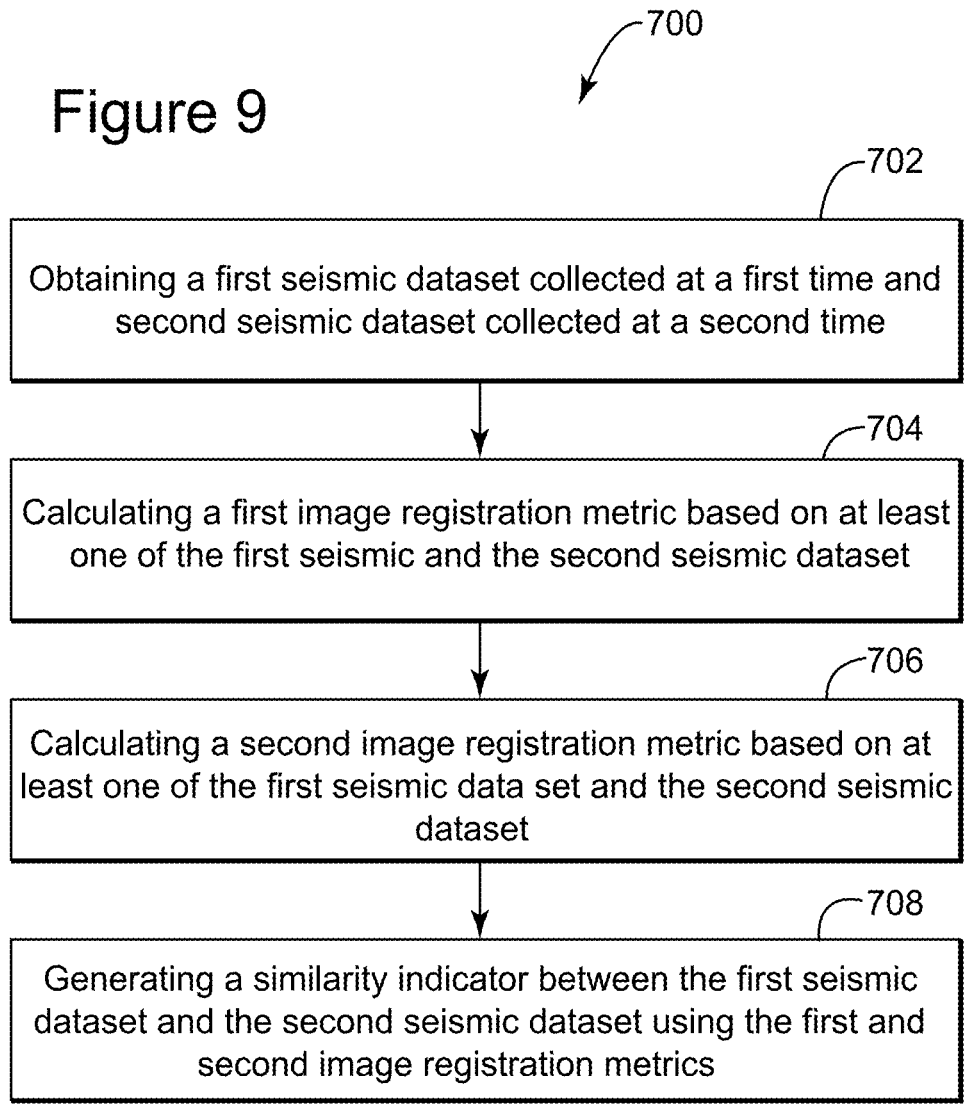
FIG. 9 is a flowchart depicting a method for generating a similarity indicator according to an embodiment.

Looking now to FIG. 9, an exemplary method 700 for generating a similarity indicator according to an embodiment is depicted. Starting at step 702 of the exemplary method embodiment, various seismic data is obtained, i.e., a first seismic dataset is collected at a first time and second seismic dataset is collected at a second time. It should be noted in the exemplary method embodiment that the mapped dataset can be generated by first partitioning the first/base imprint dataset into iso-intensity sets and then mapping the iso-intensity sets onto the second/current dataset. The first seismic dataset can be identified as a base imprint and collected from a database of datasets associated with a prior seismic sampling session. The sample time of the first seismic dataset and the sample time of the second seismic dataset are different, therefore providing the fourth dimension to the analysis.

Next at step 704 of the exemplary method embodiment, a first image registration metric is calculated based on at least one of the first seismic and the second seismic dataset. The first image registration can be a PIU metric as described above. It should be noted in the exemplary method embodiment that the PIU metric is calculated using the PIU (base, monitor) equation previously defined. Continuing at step 706 of the exemplary method embodiment, a second image registration metric based on at least one of the first seismic data set and the second seismic dataset is calculated. It should be noted in the exemplary method embodiment that the PIU metric is calculated using the PIU (base, base) equation previously defined.

Continuing at step 708 of the exemplary method embodiment, a similarity indicator value is calculated, between the first dataset and the second dataset, using the first image registration metric and the second image registration metric, e.g., by dividing the PIU (base, monitor) calculated value by the PIU (base, base) calculated value. It should be noted in the exemplary method embodiment that this value is allows the identification of a particular shot area associated with the monitor shot imprint in case re-sampling of the shot area is necessary based on a validation analysis of the similarity indicator value.

Figure 10:
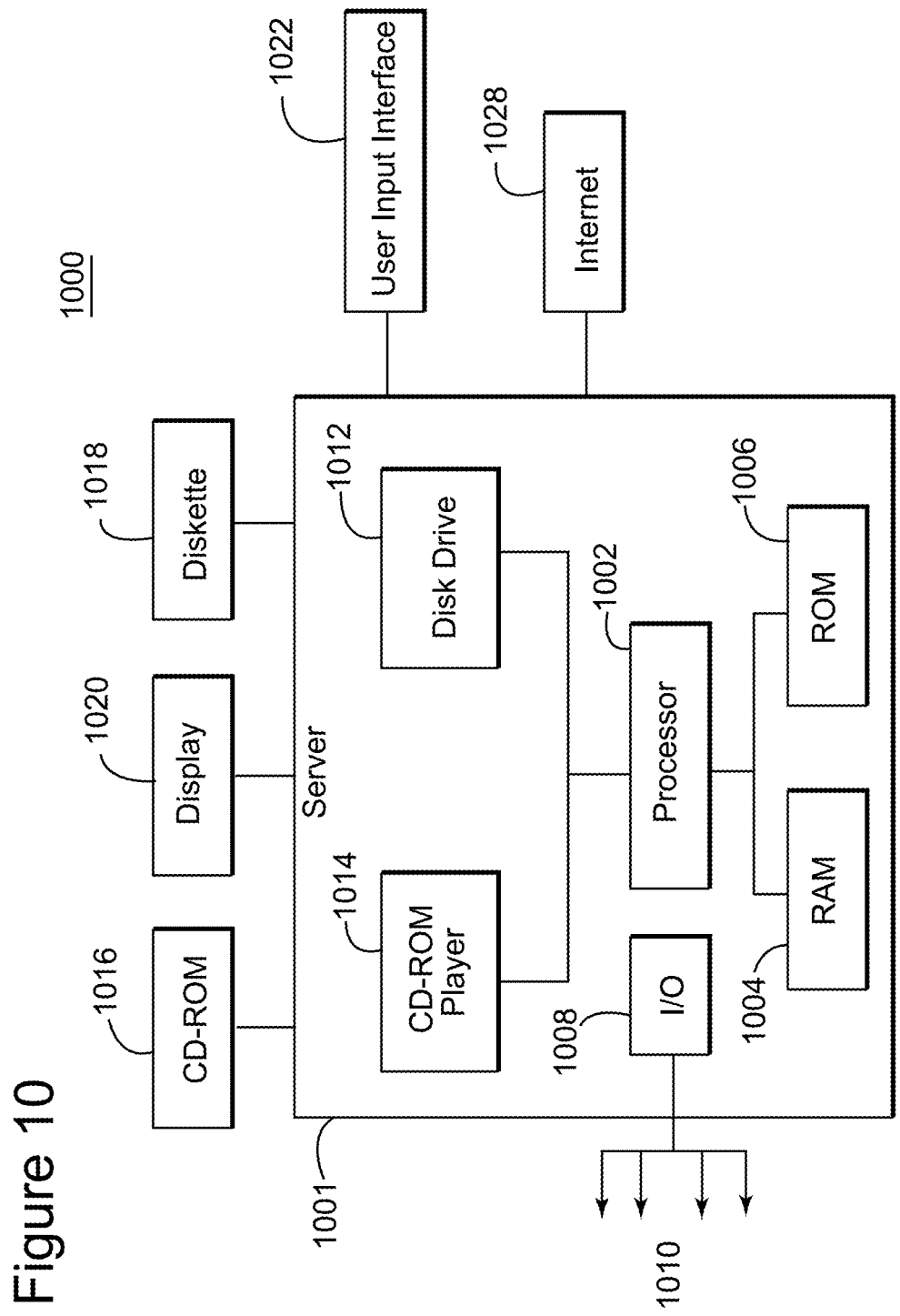
FIG. 10 is a schematic diagram of a server suitable for use in generating a similarity indicator according to an embodiment.

The computing device or other network nodes involved in the similarity indicator calculation in connection with the above described embodiments may be any type of computing device capable of processing and communicating shot imprint datasets associated with a seismic survey. An example of a representative computing system capable of carrying out operations in accordance with the servers of the exemplary embodiments is illustrated in FIG. 10. Hardware, firmware, software or a combination thereof may be used to perform the various steps and operations described herein. The computing structure 800 of FIG. 10 is an exemplary computing structure that may be used in connection with such a system.

The exemplary computing arrangement 800 suitable for performing the activities described in the exemplary embodiments may include a similarity indicator processing server. Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as is known in the art, as dictated by software and/or firmware instructions.

The server 801 may also include one or more data storage devices, including hard and floppy disk drives 812, CD-ROM drives 814, and other hardware capable of reading and/or storing information such as DVD, etc. In one embodiment, software for carrying out the above discussed steps may be stored and distributed on a CD-ROM 816, diskette 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touch pad, touch screen, voice-recognition system, etc.

The server 801 may be coupled to other computing devices, such as the landline and/or wireless terminals and associated watcher applications, via a network. The server may be part of a larger network configuration as in a global area network (GAN) such as the Internet 828, which allows ultimate connection to the various landline and/or mobile client/watcher devices.

The disclosed exemplary embodiments provide a server node, and a method for similarity indicator calculation associated with seismic data. It should be understood that this description is not intended to limit the invention. On the contrary, the exemplary embodiments are intended to cover alternatives, modifications and equivalents, which are included in the spirit and scope of the invention.

For example, parameters associated with the partitioning can be fixed for the whole survey. A minimum threshold value of similarity may be defined to easily validate repeatability of current shots or lines. Alternatively, or additionally, current source and receiver depths can be taken into account to correct real-time for swell and handle streamers having curved shapes in the computation of illumination imprints.

Accordingly, it will be appreciated that the foregoing embodiments introduce, among other things, a new indicator to assess 4D acquisition repeatability at fine discrimination scales, ranging from set of lines down to individual shots. This indicator is based upon geophysical notions and methods, where repeatability is controlled from effective illumination induced on selected sub-surface target horizons. More specifically, it evaluates similarity between illumination imprints from current and reference shots (or lines). Similarity, according to one embodiment, is computed from an adaptation of Partitioned Intensity Uniformity metric. Application to real time-lapse shots comparison demonstrates its simplicity of use for on-board quality control.

This repeatability indicator can be used to straightforwardly identify and locate necessary re-shoot lines during towed streamers acquisitions. It can also be used to assess isolated under-shoots or source positioning in nodes surveys. As such, it provides a user-friendly tool for on-board quality control of seismic coverage and real-time support for re-shoot decisions.

According to an embodiment, a metric derived from Partitioned Intensity Uniformity has been used as an image registration metric. However other metrics can be used, e.g., Ratio Intensity Uniformity, Cross-correlation, etc. Accordingly, it should be understood that the term "image registration metric" is intended to be generic to these, and other, image registration metrics.

According to an embodiment, a similarity indicator is a scalar formed by dividing an image registration metric associated with a base-monitor pair mapped imprint by an image registration metric associated with a base imprint. However the invention is not limited thereto, e.g., the similarity indicator could be a vector quantity. Image registration metrics based on the two seismic data sets can be combined in any desired manner to generate a similarity indicator. For example weighting and/or normalization can be performed as:

$$\text{Similarity} = W(\text{shot}) N(\text{survey}A, \text{survey}B) IR\_\text{METRIC}(\text{survey}A, \text{survey}B)$$

where
{surveyA,surveyB}={base survey,monitor survey},
N is a normalizing function,
W is a weighting function, and
IR_METRIC (survey A, survey B) is a function (e.g., division but not limited thereto) of two seismic data sets.

As examples of the foregoing similarity indication equation, and using surveyA=base, surveyB=monitor, W=1, then:

$$IR\_\text{METRIC}(.,.) = PIU(.,.), N(\text{survey}A, \text{survey}B) = 1/PIU(\text{survey}A, \text{survey}A),$$

which yields the example described above, i.e., that similarity=PIU(base,monitor)/PIU(base,base).

However if instead surveyA=monitor, surveyB=base, W=1, then:

$$IR\_\text{METRIC}(.,.) = PIU(.,.), N(\text{survey}A, \text{survey}B) = 1/PIU(\text{survey}A, \text{survey}A),$$

such that the counterpart similarity indicator is obtained, i.e., similarity=PIU(monitor,base)/PIU(monitor,monitor).

Even more generally, any linear combination can be used in the calculation of the similarity indicator, e.g., reciprocal similarity as:

similarity=(PIU(base,monitor)/PIU(base,base)+PIU(monitor,base)/PIU(monitor,monitor))/2

Further, in the detailed description of the exemplary embodiments, numerous specific details are set forth in order to provide a comprehensive understanding of the invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a general purpose computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, performed in at least one processor, for generating a similarity indicator between seismic datasets acquired over a survey area, said method comprising:
    obtaining a first seismic dataset collected at a first time and a second seismic dataset collected at a second time;
    processing with the at least one processor said first seismic dataset and said second seismic dataset as first and second images, with pixels in said first and second images being associated with reflection points;
    calculating a first image registration metric based on said first image and said second image;
    calculating a second image registration metric based on one of said first image and said second image;
    generating a similarity indicator between said first seismic dataset and said second seismic dataset using said first and second image registration metrics; and
    reshooting at one or more positions in the survey area determined based on the similarity indicator.

2. The method of claim 1, wherein said first seismic dataset is a first shot imprint, said second seismic dataset is a second shot imprint, and said reflection points having intensity values associated with illumination amplitudes.

3. The method of claim 2, wherein said calculation of said first image registration metric further comprises:
    partitioning said first shot imprint into iso-intensity datasets; and
    mapping said iso-intensity datasets on said second shot imprint.

4. The method of claim 2, wherein intensity data associated with said first shot imprint, said second shot imprint, and a mapped shot imprint is based on illumination.

5. The method of claim 2, wherein said first image registration metric is:

$$PIU(\text{base, monitor}) = \sum_b \frac{n_b}{N} \frac{\sigma_b(\text{monitor})}{\mu_b(\text{monitor})}$$

where N is the total number of pixels in the first and second shot imprints, $n_b$ is the number of pixels within iso-intensity set b, $\mu_b$ is the mean measured on the second shot imprint within each mapping $b^T$ of set b and $\sigma_b$ is the standard deviation measured on the second shot imprint within each mapping $b^T$ of set b as:

$$\mu_b(\text{monitor}) = \frac{1}{n_b} \sum_{x \in b^T} I_{monitor}(x)$$

$$\sigma_b^2(\text{monitor}) = \frac{1}{n_b} \sum_{x \in b^T} (I_{monitor}(x) - \mu_b(\text{monitor}))^2$$

where the first shot imprint corresponds to a base and the second shot imprint corresponds to a monitor,
and wherein the second image registration metric is:

$$PIU(\text{base, base}) = \sum_b \frac{n_b}{N} \frac{\sigma_b(\text{base})}{\mu_b(\text{base})}$$

where N is the total number of pixels in the first and second shot imprints, $n_b$ is the number of pixels within iso-intensity set b, $\mu_b$, is the mean measured on the first shot imprint within each mapping $b^T$ of set b and $\sigma_b$ is the standard deviation measured on the first shot imprint within each mapping $b^T$ of set b as:

$$\mu_b(\text{base}) = \frac{1}{n_b} \sum_{x \in b^T} I_{base}(x)$$

$$\sigma_b^2(\text{base}) = \frac{1}{n_b} \sum_{x \in b^T} (I_{base}(x) - \mu_b(\text{base}))^2$$

wherein I is an intensity measurement of data point x and where the similarity indicator between the first shot imprint and the second shot imprint is defined as the normalized metric:

$$\text{Similarity} = \frac{PIU(\text{base, monitor})}{PIU(\text{base, base})}.$$

6. The method of claim 1, wherein said first seismic dataset is based on a first acquisition line, and said second seismic dataset is based on a second acquisition line.

7. The method of claim 1, wherein said first seismic dataset is based on a first set of acquisition lines, said second seismic dataset is based on a second set of acquisition lines.

8. The method of claim 1, wherein a predetermined threshold is configured for determining if said similarity indicator indicates an unacceptable repeatability associated with one or more shots.

9. The method of claim 1, wherein said first and second image registration metrics are Partitioned Intensity Uniformity (PIU) metrics.

10. A system for generating a similarity indicator between seismic datasets, said system comprising:
one or more processors configured to execute computer instructions and a memory configured to store said computer instructions wherein said computer instructions comprise:
a collection component configured to receive a first seismic dataset collected at a first time and a second seismic data set collected at a second time;
an engine component configured to process said first and second seismic datasets as first and second images, with pixels in said first and second images being associated with reflection points, and calculating a first image registration metric based on said first image and said second image and calculating a second image registration metric based on one of said first and second images;
a similarity component configured to calculate a similarity indicator based on said first image registration metric and said second image registration metric; and
an output component configured to output said similarity indicator to cause reshooting at one or more positions in the survey area determined based on the similarity indicator.

11. The system of claim 10, wherein said first seismic dataset is a first shot imprint, said second seismic dataset is a second shot imprint, and said reflection points having intensity values associated with illumination amplitudes.

12. The system of claim 11, wherein said engine component is further configured to calculate said first image registration metric by partitioning said first shot imprint into iso-intensity datasets; and mapping said iso-intensity datasets on said second shot imprint.

13. The system of claim 11, wherein intensity data associated with said first shot imprint, said second shot imprint, and a mapped shot imprint is based on illumination.

14. The system of claim 10, wherein said similarity component is further configured to use a predetermined threshold for determining if said similarity indicator indicates an unacceptable repeatability associated with one or more shots.

15. The system of claim 10, wherein said first and second image registration metrics are Partitioned Intensity Uniformity (PIU) metrics.

16. The system of claim 15, wherein said first image registration metric is:

$$PIU(\text{base, monitor}) = \sum_b \frac{n_b}{N} \frac{\sigma_b(\text{monitor})}{\mu_b(\text{monitor})}$$

where N is the total number of pixels in the first and second shot imprints, $n_b$ is the number of pixels within iso-intensity set b, $\mu_b$ is the mean measured on a monitor imprint within each mapping $b^T$ of set b and $\sigma_b$ is the standard deviation measured on the second shot imprint within each mapping $b^T$ of set b as:

$$\mu_b(\text{monitor}) = \frac{1}{n_b} \sum_{x \in b^T} I_{monitor}(x)$$

-continued $$\sigma_b^2(\text{monitor}) = \frac{1}{n_b} \sum_{x \in b^T} (I_{monitor}(x) - \mu_b(\text{monitor}))^2$$

where the first shot imprint corresponds to a base and the second shot imprint corresponds to a monitor, and wherein the second image registration metric is:

$$PIU(\text{base, base}) = \sum_b \frac{n_b}{N} \frac{\sigma_b(\text{base})}{\mu_b(\text{base})}$$

where N is the total number of pixels in the first and second shot imprints, $n_b$ is the number of pixels within iso-intensity set b, $\mu_b$ is the mean measured on the first shot imprint within each mapping $b^T$ of set b and $\sigma_b$ is the standard deviation measured on the first shot imprint within each mapping $b^T$ of set b as:

$$\mu_b(\text{base}) = \frac{1}{n_b} \sum_{x \in b^T} I_{base}(x)$$

$$\sigma_b^2(\text{base}) = \frac{1}{n_b} \sum_{x \in b^T} (I_{base}(x) - \mu_b(\text{base}))^2$$

wherein I is an intensity measurement of data point x and where the similarity indicator between the first shot imprint and the second shot imprint is defined as the normalized metric:

$$\text{Similarity} = \frac{PIU(\text{base, monitor})}{PIU(\text{base, base})}.$$

* * * * *